3,400,114
TIN MODIFIED LITHIUM AROMATIC CATALYST AND PROCESS FOR POLYMERIZING BUTADIENE
William J. Trepka, Bartlesville, Okla., assignor to Phillips Petroleum Company, a corporation of Delaware
No Drawing. Filed May 7, 1964, Ser. No. 365,824
16 Claims. (Cl. 260—94.3)

This invention relates to a method of polymerizing butadiene to form an improved rubbery polymer. In another aspect it relates to a modified catalyst composition which can be used to form polybutadiene of increased cis 1,4-content.

A number of processes have been developed for polymerizing butadiene to form a synthetic polymer which can be used to replace natural rubber. Those rubbery polybutadienes which have a high amount of cis-1,4-configuration are particularly valuable in automobile and truck tires since they exhibit low heat build-up on flexing and have outstanding wear properties.

1,3-butadiene can be polymerized to a rubbery polymer with organo-lithium initiators, such as n-butyllithium. These polymerizations are normally carried out in hydrocarbon solutions and can be very conveniently controlled to form polymer in high yields. The cis content of such polymers is, however, typically about 40 percent. By using different types of organolithium initiators, the cis content of the polymers can be increased, but there remains much room for improvement in this respect. Increasing the cis content of these butadiene polymers improves their resilience and hysteresis as evidenced by lower heat build-up. It is, therefore, highly desirable that improvements be made in organolithium polymerization of butadiene to form rubbery polymers of increased cis 1,4-configuration.

I have found that polybutadienes having considerably higher cis 1,4-content than heretofore possible with organolithium-initiated polymerization can be obtained by using selected, sparingly soluble organolithium initiators which are modified with allylic-type tin compounds. These selected initiators are lithium derivatives of thiophenols or benzylmercaptans and can be formed by reacting an alkyllithium, such as n-butyllithium, with a halogenated thiophenol or a halogenated benzyl mercaptan. These halogenated mercapto-aromatic compounds which are used to form the initiator compositions can be represented by the following general formula:

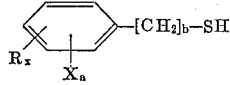

wherein X is halogen, $a$ is 1 or 2, and R is a saturated aliphatic or cycloaliphatic radical, $x$ is 0 to 3, and $b$ is 0 or 1. The total number of carbon atoms in the R groups should not exceed 6. The halogen atoms are preferably chlorine, bromine or iodine. It is preferred that at least one position ortho to the halogen be unsubstituted.

The modifier which is used with the above-described initiator to form polymers of increased cis content is an organotin compound in which a single tetravalent tin atom is bonded to at least one allylic-type organic radical and any remaining tin valences are satisfied with aromatic radicals such as phenyl, naphthyl, or biphenylyl. The tin modifier can be represented by the general formula $SnR'_4$ wherein each R' is an allylic-type group having 3 to 12 carbon atoms or an aromatic radical having 6 to 12 carbon atoms, at least one of the R' groups being the allylic-type group. The initiator should be used in limited amounts, as will be indicated more fully in the following discussion.

It is an object of my invention to provide a method of polymerizing butadiene to form a polymer having increased cis content.

Another object is to provide a modified organolithium catalyst composition which is suitable for polymerizing butadiene.

Another object is to provided a method of modifying an organolithium polymerization process in order to increase the cis content of the polybutadiene formed while at the same time reducing the inherent viscosity of the polymer.

Other objects, advantages and features of my invention will be apparent to one skilled in the art from the subsequent description.

Both the phenyl- and benzyl-type initiators which are used in this invention can be prepared, for example, by reacting the halogenated thiophenol on the one hand or the halogenated benzylmercaptan on the other with a lithium alkyl in hydrocarbon diluent so that a precipitate is formed. Suitable lithium alkyls include ethyllithium, n-butyllithium, n-hexyllithium, n-dodecyllithium or the like, but the lower alkyllithiums of 2 to 6 carbon atoms are preferred. The solid product is separated by centrifugation or filtration and can be washed to remove unreacted materials and then redispersed in the hydrocarbon.

The initiator which is formed from the halogenated thiophenol can be prepared, in addition to the method discussed above, by reacting the halogenated thiophenol with lithium metal. The lithium can, for example, be used in the form of wire or chunks and the reaction can be carried out in a hydrocarbon medium or in an ethereal medium such as diethyl ether, tetrahydrofuran, dioxane, or a mixture of such ethers. When ethers are used for the initiator preparation, they are replaced with a hydrocarbon diluent prior to charging the initiator to the polymerization system.

Alternatively to the use of lithium metal, hydrocarbon-lithium compounds can be used to react with the halogenated thiophenol in either a hydrocarbon or ether medium. If an ether is used, it is replaced before the initiator is charged to the polymerization as stated above. The hydrocarbon-lithium compound can be any aliphatic, cycloaliphatic, or aromatic lithium derivative which is soluble in the diluent used for initiator preparation. As stated previously, alkyllithiums, and particularly the lower alkyllithiums, are preferred.

The initiator which is made from the halogenated thiophenol can be represented by the following formula

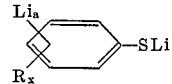

wherein $a$ is 1 or 2, R is as previously defined and $x$ is 0 to 3. Examples of such initiators include:

lithium (4-lithio)thiophenolate,
lithium (2-lithio)thiophenolate,
lithium (3-lithio)thiophenolate,
lithium (3,5-dilithio)thiophenolate,
lithium (2,4-dilithio)thiophenolate,
lithium (3-lithio-2-methtyl thiophenolate,
lithium (4-lithio-2-methyl)thiophenolate,
lithium (5-lithio-2-methyl)thiophenolate,
lithium (4-lithio-3-methyl)thiophenolate,
lithium (5-lithio-3-methyl)thiophenolate,
lithium (2-lithio-4-methyl)thiophenolate,
lithium (3-lithio-4-methyl)thiophenolate,
lithium (2,4-dilithio-6-methyl)thiophenolate,
lithium (3,5-dilithio-4-methyl)thiophenolate,
lithium (3,5-dilithio-6-methyl)thiophenolate,
lithium (2-lithio-4,5-dimethyl)thiophenolate,
lithium (4-lithio-2,6-di-n-propyl)thiophenolate,
lithium (3-lithio-5-cyclohexyl)thiophenolate, lithium (2-lithio-4-n-butyl)thiophenolate,
lithium (2-lithio-4-n-hexyl)thiophenolate,
lithium (2-lithio-4,5,6-triethyl)thiophenolate,
lithium (4-lithio-2-methyl-6-isopropyl)thiophenolate, and the like.

The initiators prepared from the halogenated benzylmercaptans are complexes between the mercaptan and the lithium alkyl which is added thereto. These initiator compositions, in contrast to the lithium alkyls, are only sparingly soluble in hydrocarbon diluents. The halogenated benzyl mercaptans can be represented by the formula

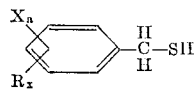

wherein $a$ is 1 or 2, or X is halogen, preferably chlorine, bromine, or iodine, R is as previously defined and $x$ is 0 to 3. Examples of suitable halogenated benzyl mercaptans include 4-chlorobenzyl mercaptan,
2,5-dichlorobenzyl mercaptan,
3-chloro-5-methylbenzyl mercaptan,
4-bromobenzyl mercaptan,
3-iodobenzyl mercaptan,
3,5-dichlorobenzyl-2-methylbenzyl mercaptan,
3,5-dibromobenzyl mercaptan,
2-chloro-4-iodobenzyl mercaptan,
3-chloro-5-bromobenzyl mercaptan,
4-chloro-2-methylbenzyl mercaptan,
5-bromo-2-methylbenzyl mercaptan,
2,4-dichloro-5-methylbenzyl mercaptan,
2,4-diiodo-5-methylbenzyl mercaptan,
4-chloro-2,6-dimethylbenzyl mercaptan,
3-bromo-5-ethyl-6-n-butylbenzyl mercaptan,
2-iodo-4-cyclopentylbenzyl mercaptan,
2,4-dichloro-6-n-hexylbenzyl mercaptan,
2-chloro-4,5,6-triethylbenzyl mercaptan,
4-chloro-2,6-di-n-propylbenzyl mercaptan,
3-bromo-5,6-dimethylbenzyl mercaptan, and the like.

The temperature used for initiator preparation can vary considerably, for example, from −50 to 150° C., preferably 0 to 100° C. It is convenient to use the reflux temperature of the diluent since refluxing the diluent at atmospheric pressure provides a convenient method of temperature control. The reaction mixture should be well agitated and when using lithium metal, the lithium should be used in excess. A hydrocarbon-lithium compound should be used in at least a stoichiometric quantity, and preferably in excess. In determining stoichiometric amounts for this reaction, it is assumed that a lithium atom adds to the aromatic compound to replace each halogen atom and the hydrogen of the mercapto group. A molar excess of up to 4 or 5 times that required by the reaction is frequently desirable.

The tin modifiers have at least one allylic-type organic radical bonded to the tin atom. By "allylic-type" radical is meant an unsaturated organic radical in which the double bond is 1 carbon atom removed from the tin, as represented by the formula:

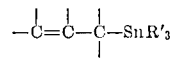

in which the unsatisfied valences shown are bonds to hydrogen or hydrocarbon radicals or the carbons of the double bond can be joined in a ring structure as in benzyl or 2-thienylmethyl. Preferred radicals of this type are alkenyl and benzyl radicals having 3 to 12 carbon atoms. The R′ groups in the above formula are as previously defined and can be of the allylic-type or aromatic radicals in which the tin is bonded to a ring-carbon, such as phenyl, 1-naphthyl, 2-naphthyl, 2-biphenylyl, 3-biphenylyl, or 4-biphenylyl, or alkyl-substituted derivatives thereof having up to 12 carbon atoms.

The tin modifiers are preferably allyl- or benzyltin compounds which can contain up to 3 phenyl groups. Examples of such compounds which come within the scope of the general formula given above include:

tetraallyltin,
diallyldiphenyltin,
allyltriphenyltin,
tribenzylphenyltin,
dibenzyldiphenyltin,
tetra-2-butenyltin,
tri-1-methallyl-4-tolyltin,
di-2-hexenyldi-(3,5-di-n-propylphenyl)tin,
2-dodecenyltri-1-naphthyltin,
di-6-phenyl-2-hexenyldi-4-ethyl-2-naphthyltin,
tri-4-methyl-2-hexenyl-2-biphenylyltin,
tetra-4-cyclohexyl-2-butenyltin,
3-benzyl-2-propenyltri-3-biphenylyltin,
tri-5(4-tolyl)-2-pentenyl-4-biphenylyltin,
tri-2-methylbenzyl-4(4′-methylbiphenylyl)tin,
di-3,5-diethylbenzyldi-3-tolyltin,
tetra-4-n-amylbenzyltin,
tri-4-tert-butylbenzyl-2-naphthyltin,
di-2,4,6-trimethylbenzyldiphenyltin,
tri-2-thienylmethylphenyltin,
tetra[3,4-dimethyl-(2-thienylmethyl)]tin,
tri[4-n-propyl-(2-thienylmethyl)]phenyltin,
di[4,5-diethyl-(2-thienylmethyl)]diphenyltin, and the like.

While the allylic-type tin compound can contain up to 3 aromatic radicals such as phenyl, naphthyl, or biphenylyl, I have found that these aromatic radicals cannot be replaced with alkyl groups. For example, polymer modification was not observed with diallyldibutyltin. I have also found that the modification by the described tin compound is specific to the initiators described, as addition of the tin compounds to polymerizations initiated by 1,4-dilithiobutane, 3-bromophenyllithium or the reaction products of butyllithium with benzyl alcohol or 3-bromobenzyl alcohol did not increase the cis contents of the polybutadienes formed.

The polymerizations are carried out in predominantly hydrocarbon diluents at temperatures in the range of about −100 to 150° C., preferably between −75 to 100° C. The improvement in cis content provided by the allylic tin modification is favored at lower temperatures. Reaction rates are much slower at low temperatures, however, so that depending upon the circumstances, intermediate temperatures of about 25 to 75° C. are most often used.

The amount of initiator charged should be maintained at a low value and polymerizations can be carried out with as little as 0.5 gram milliequivalents of initiator per 100 grams of monomers. It is preferred to use at least 1.0 milliequivalent of initiator per 100 weight parts of monomer. The charging of initiator is based on the actual carbon-lithium bonds present in the initiator derived from a halogenated thiophenol, and on the complex mixture made up largely of carbon-lithium bonds derived from a halogenated benzyl mercaptan. These can be distinguished from inactive species by a titration method involving potentiometric techniques. A sample of initiator can be hydrolyzed with water and/or ethanol and titrated with HCl. When pH is plotted against volume of acid, a curve showing two breaks is found. Titration to the first break determines approximately the equivalence of carbon-lithium bonds present, while the latter portion of the curve gives only inactive species, that are not included in the equivalent weight of the initiator.

In order to benefit from the modification of the tin compound, the initiator concentration should be held at a low level, ordinarily not over 3 milliequivalents per 100 parts by weight of monomer, and it is preferred that the initiator level not exceed 2 milliequivalents per 100 weight parts of monomer. In commercial operations where significant amounts of initiator poisons may be present in the feedstocks, somewhat higher amounts of initiator can be permitted. It is frequently necessary to increase the amount of initiator charged in commercial operations in order to overcome the disadvantage of the presence of initiator poisons and achieve satisfactory polymerization rates and conversions.

The amount of tin modifier used should be at least 0.05 milliequivalent of allylic-type group per 100 parts by weight of monomer and ordinarily does not exceed 10 milliequivalents on the same basis. The range of modifier level is preferably in the range of about 0.2 to 5 milliequivalents per 100 weight parts of monomer. This ratio is subject to variance depending upon the initiator, the amount of initiator, and the particular tin modifier used. The equivalent weight of the modifier depends upon the number of allylic-type groups attached to the tin atom. For example, one mole of tetraallyltin is 4 equivalents and one mole of tribenzylphenyltin is 3 equivalents. The modifier can be added to the polymerization mixture after charging the diluent, monomer and initiator or the initiator and modifier can be premixed prior to charging to the polymerization reactor. As the amount of modifier is increased, the inherent viscosity of the polymer is decreased with initiator level remaining constant. Also, increasing the level of modifier tends to increase the cis content of the polybutadiene formed. The cis content can also be increased without greatly changing the inherent viscosity by maintaining the level of modifier constant and reducing the amount of initiator used. The process of this invention, therefore, provides considerable flexibility and choice of polymer properties.

Suitable hydrocarbon diluents include benzene, toluene, cyclohexane, methylcyclohexane, xylene, n-butane, n-hexane, n-heptane, isooctane, n-decane, and similar paraffins, cycloparaffins and aromatics containing about 4 to 10 carbon atoms per molecule. The polymerization mixture should be agitated and the reaction time can extend from a few minutes to 100 hours or more. Usually a short induction period is required depending upon the temperature and the initiator which is used. At the end of the reaction the initiator can be inactivated and the polymer coagulated by adding an acid or an alcohol. Polymer is then separated, washed and dried using conventional recovery techniques.

In order to illustrate further the advantages of this invention, the following examples are presented. The conditions, materials and proportions presented in these examples are typical only and should not be construed to limit my invention unduly.

Example I

Lithium (4-lithio)thiophenolate was prepared by reacting n-butyl-lithium with 4-chlorothiophenol and used as the initiator for the polymerization of butadiene in a series of runs in which variable quantities of tetraallyltin were present. The following recipe was employed for preparation of the initiator:

| | Moles |
|---|---|
| 4-chlorothiophenol (7.23 grams) | 0.05 |
| n-Butyllithium | 0.125 |
| Toluene | 1.87 |
| Temperature, °C. | 50 |
| Time, hours | 48 |

Toluene was charged first, the reactor was purged with nitrogen, 4-chlorothiophenol was added, and then the butyllithium. After 48 hours the mixture was centrifuged and the supernatant liquid decanted. Approximately 140 milliliters of n-pentane was added to disperse the solid product, lithium (4-lithio)thiophenolate. This procedure removed unreacted materials and side products. An aliquot of the pentane dispersion was withdrawn, poured into a 50/50 volume mixture of ethanol and water, and titrated potentiometrically with 0.05 normal hydrochloric acid. Results showed 0.0248 equivalents of active lithium (organolithium) or a yield of 49.8 mole percent, i.e. conversion of C—Cl to C—Li.

The following recipe was employed for the polymerization of butadiene using the lithium (4-lithio)thiophenolate:

| | |
|---|---|
| 1,3-butadiene, parts by weight | 100 |
| Cyclohexane, parts by weight | 780 |
| Initiator, meq./hm.[1] | 1.3 |
| Tetraallyltin (TAT), meq./hm.[1] | Variable |
| Temperature, °C. | 50 |
| Time, hours | 24 |

[1] Milliequivalents per 100 parts monomer on the same weight basis.

Cyclohexane was charged first, the reactor was purged with nitrogen, and butadiene, initiator, and tetraallyltin were added in the order named. At the close of the polymerizations the reactions were terminated by the addition of an isopropyl alcohol solution of 2,2′-methylene-bis(4-methyl-6-tert-butylphenol), the amount used being sufficient to provide one part by weight of the antioxidant per 100 parts rubber. The polymers were coagulated with isopropyl alcohol, separated and dried. Micro structure, inherent viscosity, and gel were determined on each of the products. The results are summarized in the following table:

TABLE I

| Run No | TAT, meq./hm | Conv., percent | Inh. Visc. | Gel, percent | Microstructure, percent | | |
|---|---|---|---|---|---|---|---|
| | | | | | Cis | Trans | Vinyl |
| 1 | 0 | 100 | 6.26 | 0 | 58.5 | 36.1 | 5.4 |
| 2 | 0.1 | 99.3 | 4.92 | 0 | 60.3 | 34.6 | 5.1 |
| 3 | 0.2 | 100 | 4.57 | 0 | 61.3 | 33.4 | 5.3 |
| 4 | 0.4 | 100 | 3.76 | 0 | 63.1 | 31.9 | 5.0 |
| 5 | 0. | 99.3 | 2.86 | 0 | 66.7 | 28.4 | 4.9 |
| 6 | 1.2 | 97.2 | 2.16 | 0 | 69.5 | 26.2 | 4.3 |
| 7 | 1.8 | 67.0 | 1.60 | 0 | 84.5 | 11.9 | 3.6 |
| 8 | 2.0 | 69.8 | [1]1.59 | 0 | 82.7 | 13.6 | 3.7 |

[1] This polymer had a Mooney value (ML-4 at 212° F.) of 27.5.

These data show that as the tetraallyltin was increased (initiator level constant) there was a decrease in inherent viscosity and an increase in cis content of the polymer formed.

Example II

A polymerization initiator was prepared by reacting n-butyllithium with 4-chlorothiophenol using the recipe and procedure given in Example I. An aliquot of the total reaction mixture was titrated potentiometrically with 0.05 normal hydrochloric acid. The active lithium content was 55.2 mole percent (0.0276 equivalents active lithium present).

The lithium (4-lithio)thiophenolate was employed as the initiator in a series of runs for the polymerization of butadiene. In this series the initiator level was varied and the tetraallyltin was held constant. The polymerization recipe was as follows:

| | |
|---|---|
| 1,3-butadiene, parts by weight | 100 |
| Cyclohexane, parts by weight | 780 |
| Initiator, meq./hm. | Variable |
| Tetraallyltin, meq./hm. | 1.6 |
| Temperature, °C. | 50 |
| Time, hours | 24 |

The procedure was the same as in Example I. Following is a summary of the runs:

TABLE II

| Run No. | Init., meq./hm. | Conv., percent | Inh. Visc. | Gel, percent | Microstructure, percent | | |
|---|---|---|---|---|---|---|---|
| | | | | | Cis | Trans | Vinyl |
| 1 | 1.3 | 98.8 | 2.11 | 0 | 70.2 | 25.4 | 4.4 |
| 2 | 1.4 | 96.4 | 2.17 | 0 | 65.7 | 29.6 | 4.7 |
| 3 | 1.5 | 98.0 | 2.24 | 0 | 60.7 | 34.1 | 5.2 |
| 4 | 1.6 | 98.8 | 2.25 | 0 | 60.8 | 33.9 | 5.3 |
| 5 | 1.7 | 97.2 | 2.21 | 0 | 60.8 | 33.6 | 5.6 |
| 6 | 1.8 | 98.5 | 2.11 | 0 | 59.2 | 35.2 | 5.6 |

These data show that a somewhat lower cis content was obtained at the higher initiator levels (Runs 3–5) than in Runs 1 and 2. The relatively constant inherent viscosities with increasing initiator levels emphasize that inherent viscosity was controlled largely by the level of the tetraallyltin.

Example III

The procedure of the preceding example was repeated except that the lithium (4-lithio)thiophenolate initiator was premixed with tetraallyltin prior to addition to the polymerization reaction. These materials were mixed at ice bath temperature, shaken vigorously for one minute and then charged immediately to the reactor. Two milliequivalents of initiator and 3.1 milliequivalents of tetraallyltin were used per 100 grams of monomer. One hundred percent conversion was achieved. The polybutadiene recovered had a cis content of 65.1 percent and an inherent viscosity of 1.82.

Example IV

Polybutadiene was polymerized as in the preceding examples except that the initiator was the reaction product of n-butyllithium and 4-chlorobenzyl mercaptan. The following recipe was employed for preparation of the initiator:

| | |
|---|---|
| 4-chlorobenzyl mercaptan (3.97 grams) ___mole__ | 0.025 |
| n-Butyllithium _____do____ | 0.104 |
| Toluene, ml. _____ | 200 |
| Temperature, °C. _____ | 50 |
| Time, hours _____ | 48 |

The procedure for preparing the initiator was similar to that described in Example I.

The amount of initiator used was 1.8 milliequivalents per 100 parts of butadiene with variable amounts of tetraallyltin being employed. The polymers recovered had the following properties:

TABLE III

| Run No. | Init., meq./hm. | TAT, meq./hm. | Microstructure, percent ||| Inherent Viscosity |
|---|---|---|---|---|---|---|
| | | | Cis | Trans | Vinyl | |
| 1 | 1.8 | 0 | 64.1 | 30.8 | 5.1 | 7.47 |
| 2 | 1.8 | 0.8 | 68.7 | 26.9 | 4.4 | 3.26 |
| 3 | 1.8 | 1.2 | 68.2 | 28.4 | 4.4 | 2.42 |
| 4 | 1.8 | 1.6 | 79.6 | 16.4 | 4.0 | 2.18 |
| 5 | 1.8 | 2.0 | 85.9 | 10.5 | 3.6 | 1.95 |

These data show that tetraallyltin modification of the polymerization initiated by the 4-chlorobenzyl mercaptan/n-butyllithium reaction product increased the cis content of the product.

Example V

The procedure of the preceding example was repeated at 70° C. and 30° C. The results are shown in the following tables at varying initiator levels and quantities of tetraallyltin:

TABLE IV
[70° C.]

| Run No. | Init., meq./hm. | TAT, meq./hm. | Microstructure, percent ||| Inherent Viscosity |
|---|---|---|---|---|---|---|
| | | | Cis | Trans | Vinyl | |
| 1 | 1.4 | 2.0 | 63.8 | 30.2 | 6.0 | 2.36 |
| 2 | 1.3 | 2.0 | 65.1 | 29.1 | 5.8 | 2.27 |
| 3 | 1.2 | 2.0 | 65.4 | 29.0 | 5.6 | 2.34 |
| 4 | 1.1 | 2.0 | 65.6 | 28.8 | 5.6 | 2.35 |
| 5 | 1.0 | 2.0 | 86.1 | 9.8 | 4.1 | 1.99 |

TABLE V
[30° C.]

| Run No. | Init., meq./hm. | TAT, meq./hm. | Microstructure, percent ||| Inherent Viscosity |
|---|---|---|---|---|---|---|
| | | | Cis | Trans | Vinyl | |
| 6 | 1.8 | 0 | 64.2 | 31.3 | 4.5 | 7.01 |
| 7 | 1.8 | 0.4 | 67.6 | 28.3 | 4.1 | 4.99 |
| 8 | 1.8 | 0.8 | 74.8 | 21.3 | 3.9 | 3.58 |
| 9 | 1.8 | 1.2 | 71.2 | 24.8 | 4.0 | 2.87 |
| 10 | 1.8 | 1.6 | 85.2 | 11.6 | 3.2 | 1.92 |
| 11 | 1.8 | 2.0 | 83.0 | 13.5 | 3.5 | 1.66 |

The above runs illustrate the advantage of lower polymerization temperatures but show that the modification with tetraallyltin was effective at both temperatures.

Example VI

Butadiene was polymerized at 50° C. using as the initiator the reaction product of butyllithium and 4-chlorobenzyl mercaptan and the polymerization was modified with diallyldiphenyltin (DADPT). The diallyldiphenyltin was prepared by reacting magnesium with 3-bromopropene and diphenyltin dichloride in tetrahydrofuran. The properties of the polymers obtained are shown in the following table:

TABLE VI

| Run No. | Init., meq./hm. | DADPT, meq./hm. | Microstructure, percent ||| Inherent Viscosity |
|---|---|---|---|---|---|---|
| | | | Cis | Trans | Vinyl | |
| 1 | 1.6 | 0 | 70.8 | 24.3 | 4.9 | 8.74 |
| 2 | 1.6 | 1.2 | 75.1 | 20.4 | 4.5 | 2.20 |
| 3 | 1.5 | 1.2 | 82.9 | 13.1 | 4.0 | 2.14 |
| 4 | 1.4 | 1.2 | 87.7 | 8.3 | 4.0 | 1.62 |

The above data show that diallyldiphenyltin is an effective modifier for increasing the cis content of the polymer.

Example VII

The polymerization of butadiene at 50° C. with the reaction product of butyllithium and 4-chlorobenzyl mercaptan was modified with allyltriphenyltin (ATPT) at various initiator levels and amounts of modifier. The results are shown in the following table:

TABLE VII

| Run No. | Init, meq./hm. | ATPT, meq./hm. | Microstructure, percent ||| Inherent Viscosity |
|---|---|---|---|---|---|---|
| | | | Cis | Trans | Vinyl | |
| 1 | 1.9 | 0 | 59.7 | 34.7 | 5.6 | 5.06 |
| 2 | 1.9 | 0.8 | 60.1 | 34.6 | 5.3 | 2.36 |
| 3 | 1.8 | 0.7 | 65.8 | 29.6 | 4.6 | 2.70 |
| 4 | 1.7 | 0.7 | 69.6 | 26.0 | 4.4 | 2.89 |
| 5 | 1.6 | 0.7 | 67.1 | 28.1 | 4.8 | 2.71 |
| 6 | 1.5 | 0.7 | 73.8 | 21.9 | 4.3 | 2.81 |
| 7 | 1.4 | 0.7 | 79.1 | 16.8 | 4.1 | 2.75 |

Example VIII

The polymerization of butadiene at 50° C. with the reaction product of butyllithium and 4-chlorobenzyl mercaptan was modified with tribenzylphenyltin (TBPT). The results at various initiator levels are shown in the following table:

TABLE VIII

| Run No. | Init,. meq./hm. | TBPT, meq./hm. | Microstructure, percent ||| Inherent Viscosity |
|---|---|---|---|---|---|---|
| | | | Cis | Trans | Vinyl | |
| 1 | 1.3 | 3.0 | 68.5 | 27.0 | 4.5 | 2.43 |
| 2 | 1.2 | 3.0 | 80.1 | 15.8 | 4.1 | 2.31 |
| 3 | 1.25 | 3.0 | 83.8 | 12.3 | 3.9 | 2.49 |

Example IX

Polymers prepared according to the preceding examples using the reaction product of n-butyllithium and 4-chlorobenzyl mercaptan as the initiator were compounded and evaluated in a tread stock recipe as follows:

| | Parts by weight |
|---|---|
| Polybutadiene _____ | 100 |
| High abrasion furnace black _____ | 50 |
| Zinc oxide _____ | 3 |
| Stearic acid _____ | 1 |
| Flexamine [1] _____ | 1 |
| Resin 731 D [2] _____ | 5 |
| Philrich 5 [3] _____ | 5 |
| Sulfur _____ | 1.75 |
| NOBS Special [4] _____ | 1 |

[1] Physical mixture containing 65 percent of a complex diarylamine-ketone reaction product and 35 percent of N,N'-diphenyl-p-phenylenediamine.
[2] Disproportionated pale rosin stable to heat and light.
[3] Aromatic oil.
[4] N-oxydiethylenebenzothiazole-2-sulfenamide.

The stocks were cured for 30 minutes at 307° F. On evaluation of their physical properties, these specimens were found to have particularly outstanding hysteresis characteristics as evidenced by the low heat build-up in oven aged stocks (24 hours at 212° F.) Typical values are given in the following table:

TABLE IX

| Initiator, meq./hm. | Polybutadiene | | Cis (percent) | Heat Build-up, ΔT (°F.) |
|---|---|---|---|---|
| | Modifier | | | |
| | Type | Meq./hm. | | |
| 1.8 | TAT | 1.6 | 81.5 | 37.1 |
| 1.5–1.7 a | DADPT | 1.2 | 81.7 | 39.5 |
| 1.4–1.5 a | ATPT | 0.7 | 76.4 | 35.3 |
| 1.2–1.25 a | TBPT | 3.0 | 74.5 | 46.6 |
| Commercial polybutadiene | | | 39.8 | 62.4 | a A composite of several small samples.

Example X

Pilot plant runs in commercial quantities were made using the reaction product of n-butyllithium and 4-chlorobenzyl mercaptan as the initiator for polymerizing butadiene (100 parts) in cyclohexane (780 parts). The reactions were modified with diallyldiphenyltin. The cis contents of the polymers recovered were as follows:

TABLE X

| Run No. | Initiator, meq./hm. | Modifier, meq./hm. | Time, hours | Conv., Percent | Cis content, percent |
|---|---|---|---|---|---|
| 1 | 2.0 | 1.0 | 19.3 | 100 | 83.8 |
| 2 | 2.75 | 1.2 | 24.6 | 94 | 81.9 |
| 3 | 2.75 | 1.2 | 27.5 | 92 | 81.6 |
| 4 | 2.75 | 1.2 | 29.3 | 100 | 80.7 |

In the above examples, microstructure, inherent viscosity and gel were determined for the polymers according to the following procedures:

Microstructures were determined with a commercial infrared spectrometer. For polyisoprene the samples are dissolved in carbon disulfide so as to form a solution containing 25 grams of polymer per liter of solution. Calibrations are based on deproteinized natural rubber as a reference material assuming that it contains 98 percent cis and 2 percent 3,4-addition product. The cis is measured at the 8.9 micron band and 3,4-addition at the 11.25 micron band. In the presence of a high cis polyisoprene, trans is not detectable, since trans is measured at the 8.75 micron band. The raw cis and raw 3,4-addition can be converted to normalized values by changing each value proportionally so that their sum equals 100%. For polybutadiene, similar polymer solutions were formed and the percent of the total unsaturation present as trans 1,4-was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band and the extinction coefficient was 146 (liters-mols$^{-1}$-centimeters$^{-1}$). The percent of the total unsaturation present as 1,2- (or vinyl) was calculated according to the above equation, using the 11.0 micron band and an extinction coefficient of 209 (liters-mols$^{-1}$-centimeters$^{-1}$). The percent of the total unsaturation present as cis 1,4- was obtained by subtracting the trans 1,4- and 1,2- (vinyl) determined according to the above procedure from the theoretical unsaturation, assuming one double bond per each $C_4$ unit in the polymer.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present.

The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. The wire cage was calibrated for toluene retention in order to correct the weight of swelled gel and to determine accurately the weight of dry gel. The empty cage was immsered in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weightings is the weight of the cage plus the toluene retained by it, and by substracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications can be made in this invention without departing from the spirit or scope thereof.

I claim:

1. A method of polymerizing butadiene which comprises bringing together in a hydrocarbon diluent under polymerizing conditions 1,3-butadiene, an initiator which is a sparingly soluble lithium derivative of a halogenated mercapto-aromatic compound and an organotin modifier in which a single tetravalent tin is bonded to at least one allylic-type organic radical with any remaining valences satisfied with aromatic radicals, said allylic-type organic radical being an unsaturated radical in which a double bond is one carbon removed from the tin atom, as represented by the formula

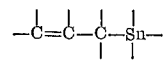

wherein the unsatisfied valences on the carbon atoms are bonds to hydrogen or hydrocarbon radicals or the carbons of the double bond can be joined in a ring structure.

2. A method of polymerizing butadiene which comprises bringing together under polymerization conditions in a hydrocarbon diluent 1,3-butadiene, an initiator selected from the group consisting of (1) a lithium (lithio)thiophenolate having the formula

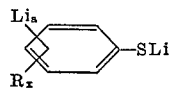

wherein $a$ is an integer of 1, to 2, R is selected from the group consisting of saturated aliphatic and saturated cycloaliphatic radicals, the total number of carbon atoms in said R groups not exceeding 6 and $x$ is an integer of 0 to 3 and (2) the reaction product of an alkyllithium with a halogenated benzyl mercaptan having the formula

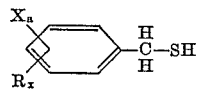

wherein R, $a$ and $x$ are as defined above and X is halogen, and an organotin modifier having the formula $SnR'_4$ wherein each R' is selected from the group consisting of allylic-type radicals having 3 to 12 carbon atoms and aromatic radicals having 6 to 12 carbon atoms, at least one of the R' radicals being of the allylic type, said allylic-type organic radical being an unsaturated radical in which a double bond is one carbon removed from the tin atom, as represented by the formula

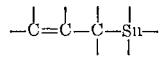

wherein the unsatisfied valences on the carbon atoms are bonds to hydrogen or hydrocarbon radicals or the carbons of the double bond can be joined in a ring structure.

3. The process according to claim 2 wherein said initiator is lithium (4-lithio)thiophenolate.

4. The process of claim 2 wherein said initiator is the reaction product of n-butyllithium and 4-chlorobenzyl mercaptan.

5. The process of claim 2 wherein said tin modifier is tetraallyltin.

6. The process of claim 2 wherein said tin modifier is diallyldiphenyltin.

7. The process of claim 2 wherein said tin modifier is allyltriphenyltin.

8. The process of claim 2 wherein said tin modifier is tribenzylphenyltin.

9. In a method of polymerizing butadiene with an organolithium initiator selected from the group consisting of (1) a lithium (lithio)thiophenolate having the formula

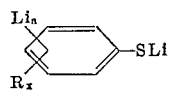

wherein $a$ is an integer of 1 to 2, R is selected from the group consisting of saturated aliphatic and saturated cycloaliphatic radicals, the total number of carbon atoms in said R groups not exceeding 6, and $x$ is an integer of 0 to 3 and (2) the reaction product of an alkyllithium with a halogenated benzyl mercaptan having the formula

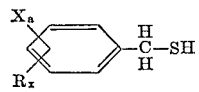

wherein R, $a$ and $x$ are as defined above and X is halogen, in a hydrocarbon diluent at a temperature in the range of $-100$ to $+150°$ C., the improvement comprising using an initiator level in the range of 0.5 to 3 milliequivalents per 100 parts by weight of monomer and adding to the polymerization from 0.05 to 10 milliequivalents of a tin modifier having the formula SnR'$_4$ wherein each R' is selected from the group consisting of allylic-type radicals having 3 to 12 carbon atoms and aromatic radicals having 6 to 12 carbon atoms, at least one of the R' radicals being of the allylic-type, said allylic-type radical being an unsaturated radical in which a double bond is one carbon removed from the tin atom, as represented by the formula

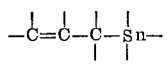

wherein the unsatisfied valences on the carbon atoms are bonds to hydrogen or hydrocarbon radicals or the carbons of the double bond can be joined in a ring structure.

10. In a method of polymerizing butadiene with an organolithium initiator selected from the group consisting of (1) a lithium (lithio)thiophenolate having the formula

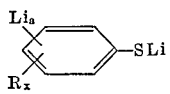

wherein $a$ is an integer of 1 to 2, R is selected from the group consisting of saturated aliphatic and saturated cycloaliphatic radicals, the total number of carbon atoms in said R groups not exceeding 6, and $x$ is an integer of 0 to 3 and (2) the reaction product of an alkyllithium with a halogenated benzyl mercaptan having the formula

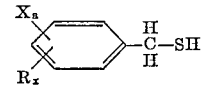

wherein R, $a$ and $x$ are as defined above and X is halogen, in a hydrocarbon diluent at a temperature in the range of $-75$ to $+100°$ C., the improvement comprising using an initiator level in the range of 1 to 2 milliequivalents per 100 parts by weight of monomer and adding to the polymerization from 0.2 to 5 milliequivalents of a tin modifier having the formula SnR'$_4$ wherein each R' is selected from the group consisting of allylic-type radicals having 3 to 12 carbon atoms and aromatic radicals having 6 to 12 carbon atoms, at least one of the R' radicals being of the allylic type, said allylic type radical being an unsaturated radical in which a double bond is one carbon removed from the tin atom, as represented by the formula

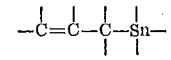

wherein the unsatisfied valences on the carbon atoms are bonds to hydrogen or hydrocarbon radicals or the carbons of the double bond can be joined in a ring structure.

11. The method of claim 10 wherein said initiator is lithium (4-lithio)thiophenolate and said tin compound is tetraallyltin.

12. The method of claim 10 wherein said initiator is the reaction product of n-butyllithium and 4-chlorobenzyl mercaptan and said tin compound is diallyldiphenyltin.

13. An initiator composition formed by the interaction of an organolithium compound which is a lithium derivative of a halogenated mercapto-aromatic compound and is sparingly soluble in hydrocarbon diluent and an organotin compound in which a single tetravalent tin atom is bonded to at least one allylic-type organic radical and any remaining valences are satisfied with aromatic radicals, said allylic-type organic radical being an unsaturated radical in which a double bond is one carbon removed from the tin atom, as represented by the formula

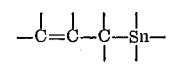

wherein the unsatisfied valences on the carbon atoms are bonds to hydrogen or hydrocarbon radicals or the carbons of the double bond can be joined in a ring structure.

14. An initiator composition formed by the interaction of an organolithium compound selected from the group consisting of (1) a lithium (lithio)-thiophenolate having the formula

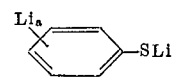

wherein $a$ is an integer of 1 to 2, R is selected from the group consisting of saturated aliphatic and saturated cycloaliphatic radicals, the total number of carbon atoms in said R groups not exceeding 6, and $x$ is an integer of 0 to 3 and (2) the reaction product of an alkyllithium with a halogenated benzyl mercaptan having the formula

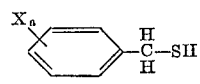

wherein R, $a$ and $x$ are as defined above and X is halogen, and an organotin compound having the formula SnR'$_4$ wherein each R' is selected from the group consisting of allylic-type radicals having 3 to 12 carbon atoms and aromatic radicals having 6 to 12 carbon atoms, at least one of the R' radicals being of the allylic-type, said allylic-type radical being an unsaturated radical in which a double bond is one carbon removed from the tin atom, as represented by the formula

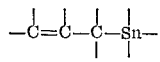

wherein the unsatisfied valences on the carbon atoms are bonds to hydrogen or hydrocarbon radicals or the carbons of the double bond can be joined in a ring structure.

15. The composition of claim 14 wherein said initiator is lithium (4-lithio)thiophenolate and said tin compound is tetraallyltin.

16. The process of claim 2 wherein said tin modifier is triallylphenyltin.

References Cited

UNITED STATES PATENTS 3,085,120    4/1963    Seyferth et al. _____ 260—94.2
3,215,679   11/1965    Trepka _____ 260—94.2

JOSEPH L. SCHOFER, *Primary Examiner.*

W. F. HAMROCK, *Assistant Examiner.*